United States Patent
Yamamichi

(10) Patent No.: US 10,442,014 B2
(45) Date of Patent: Oct. 15, 2019

(54) HOLDER, CUTTING TOOL, AND METHOD OF MANUFACTURING MACHINED PRODUCT USING THE SAME

(71) Applicant: Kyocera Corporation, Kyoto-shi, Kyoto (JP)

(72) Inventor: Kazuki Yamamichi, Yasu (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 25 days.

(21) Appl. No.: 15/575,407

(22) PCT Filed: May 23, 2016

(86) PCT No.: PCT/JP2016/065145
§ 371 (c)(1),
(2) Date: Nov. 20, 2017

(87) PCT Pub. No.: WO2016/186217
PCT Pub. Date: Nov. 24, 2016

(65) Prior Publication Data
US 2018/0154462 A1 Jun. 7, 2018

(30) Foreign Application Priority Data
May 21, 2015 (JP) .................................. 2015-103512

(51) Int. Cl.
*B23C 5/10* (2006.01)
*B23C 5/20* (2006.01)
(Continued)

(52) U.S. Cl.
CPC .............. *B23C 5/109* (2013.01); *B23C 5/006* (2013.01); *B23C 5/20* (2013.01); *B23C 5/223* (2013.01);
(Continued)

(58) Field of Classification Search
CPC ... B23C 5/003; B23C 2250/16; Y10T 408/76; B23B 2250/16
See application file for complete search history.

(56) References Cited

U.S. PATENT DOCUMENTS

| 5,605,420 A * | 2/1997 | Feldsine ................. B23C 5/006 407/32 |
| 2002/0190449 A1* | 12/2002 | Takahashi ............. B23B 29/022 267/141 |

(Continued)

FOREIGN PATENT DOCUMENTS

| DE | 3541322 A1 * | 7/1986 | ........... B23B 29/022 |
| JP | 08323526 A * | 12/1996 | ........... B23B 31/005 |

(Continued)

OTHER PUBLICATIONS

International Search Report based on Application No. PCT/JP2016/065145 (2 Pages) dated Jul. 19, 2016.

*Primary Examiner* — Alan Snyder
(74) *Attorney, Agent, or Firm* — Viering, Jentschura & Partner MBB

(57) ABSTRACT

In one embodiment, a holder includes a body part elongated from a first end part to a second end part along a rotation axis. The body part includes a first member, a second member, and a third member. The first member is located on a side of the first end part, and includes a pocket to receive a cutting insert. The second member is located closer to the second end part than the first member, and includes at least one cavity inside the second member. The third member is located closer to the second end part than the second member.

7 Claims, 18 Drawing Sheets

(51) Int. Cl.
  *B23C 5/28* (2006.01)
  *B23C 5/22* (2006.01)
  *B23C 9/00* (2006.01)
  *B23C 5/00* (2006.01)

(52) U.S. Cl.
  CPC ............... *B23C 5/28* (2013.01); *B23C 9/005* (2013.01); *B23B 2226/36* (2013.01); *B23C 2210/02* (2013.01); *B23C 2210/165* (2013.01); *B23C 2210/282* (2013.01); *B23C 2220/48* (2013.01); *B23C 2226/61* (2013.01); *B23C 2250/12* (2013.01); *B23C 2250/16* (2013.01)

(56) References Cited

U.S. PATENT DOCUMENTS

| | | | | |
|---|---|---|---|---|
| 2006/0275090 | A1* | 12/2006 | Onozuka | B23B 29/022 408/143 |
| 2010/0096228 | A1* | 4/2010 | Digernes | B23B 27/002 188/269 |
| 2010/0242696 | A1* | 9/2010 | Digernes | B23B 27/10 83/169 |
| 2011/0293381 | A1 | 12/2011 | Saji | |
| 2012/0207560 | A1 | 8/2012 | Sakamaki et al. | |
| 2013/0004250 | A1* | 1/2013 | Gamble | B23C 5/003 407/40 |
| 2015/0231706 | A1 | 8/2015 | Frank | |
| 2015/0283628 | A1* | 10/2015 | Gamble | B23C 5/003 407/11 |
| 2015/0328698 | A1* | 11/2015 | Otani | B23C 5/265 409/136 |
| 2017/0157683 | A1* | 6/2017 | Nedzlek | B23C 5/003 |

FOREIGN PATENT DOCUMENTS

| | | | | |
|---|---|---|---|---|
| JP | 2000288822 | A * | 10/2000 | ........... B23C 5/1045 |
| JP | 2006102837 | A * | 4/2006 | |
| JP | 2011115929 | A | 6/2011 | |
| JP | 2017042863 | A * | 3/2017 | |
| WO | WO-8302412 | A1 * | 7/1983 | ............ B23C 5/207 |
| WO | 2010092807 | A1 | 8/2010 | |
| WO | 2014033020 | A1 | 3/2014 | |

* cited by examiner

HOLDER, CUTTING TOOL, AND METHOD OF MANUFACTURING MACHINED PRODUCT USING THE SAME

RELATED APPLICATIONS

The present application is a national stage entry according to 35 U.S.C. § 371 of PCT application No. PCT/JP2016/065145 filed on May 23, 2016, which claims priority from Japanese application No. 2015-103512 filed on May 21, 2015, is incorporated herein by reference in its entirety.

TECHNICAL FIELD

The present embodiment relates to a holder and a cutting tool for use in a cutting process, and a method of manufacturing a machined product using these.

BACKGROUND

As a cutting tool for use in a cutting process of a workpiece, such as metals, a cutting tool described in International Publication No. 2010/092807 (Patent Document 1) has been known. The cutting tool described in Patent Document 1 is used for a turn-milling process, such as a milling process, and is referred to as an end mill. The cutting tool for use in the turn-milling process includes a tool body (holder) that rotates around a rotation axis, and a cutting insert attached to an insert attachment seat (pocket) of the holder. The cutting tool described in Patent Document 1 further includes an upper wall part protruding against the pocket. Owing to the upper wall part, the holder is less apt to be warped, thus leading to enhanced rigidity.

When the rigidity of the holder is enhanced by making it difficult for the holder to be warped by simply disposing the upper wall part as in the holder described in Patent Document 1, the space of the pocket becomes narrow by an amount of the upper wall part. This may deteriorate chip discharge performance. The present embodiment aims at providing the holder capable of retaining good chip discharge performance while restraining occurrence of chatter vibration by having high rigidity.

SUMMARY

In one embodiment, a holder includes a body part elongated from a first end part to a second end part along a rotation axis. The body part includes a first member, a second member, and a third member. The first member is located on a side of the first end part, and includes a pocket to receive a cutting insert. The second member is located closer to the second end part than the first member, and includes at least one cavity inside the second member. The third member is located closer to the second end part than the second member.

EMBODIMENTS

Figure 1:
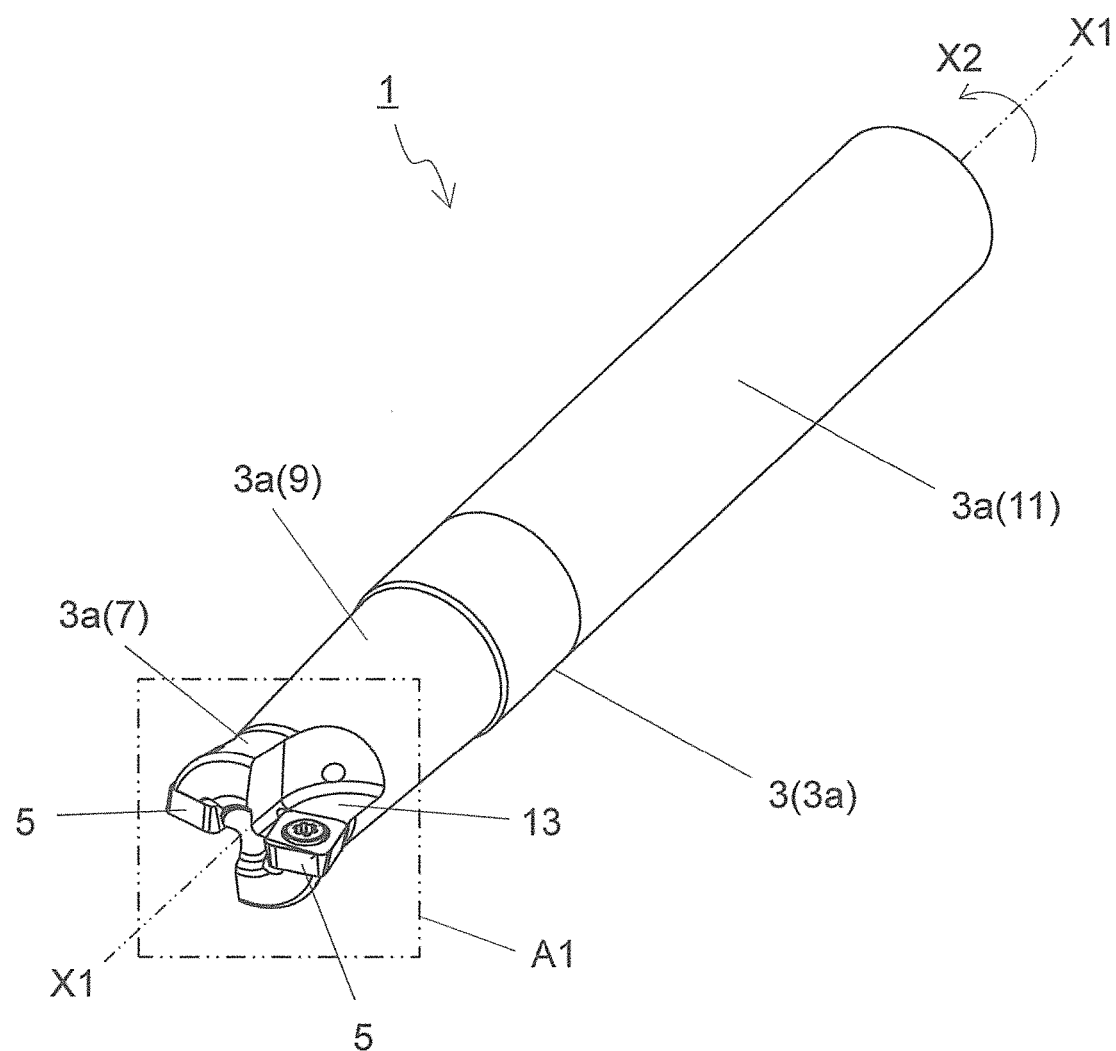
FIG. 1 is a perspective view illustrating a cutting tool in an embodiment.
Figure 2:
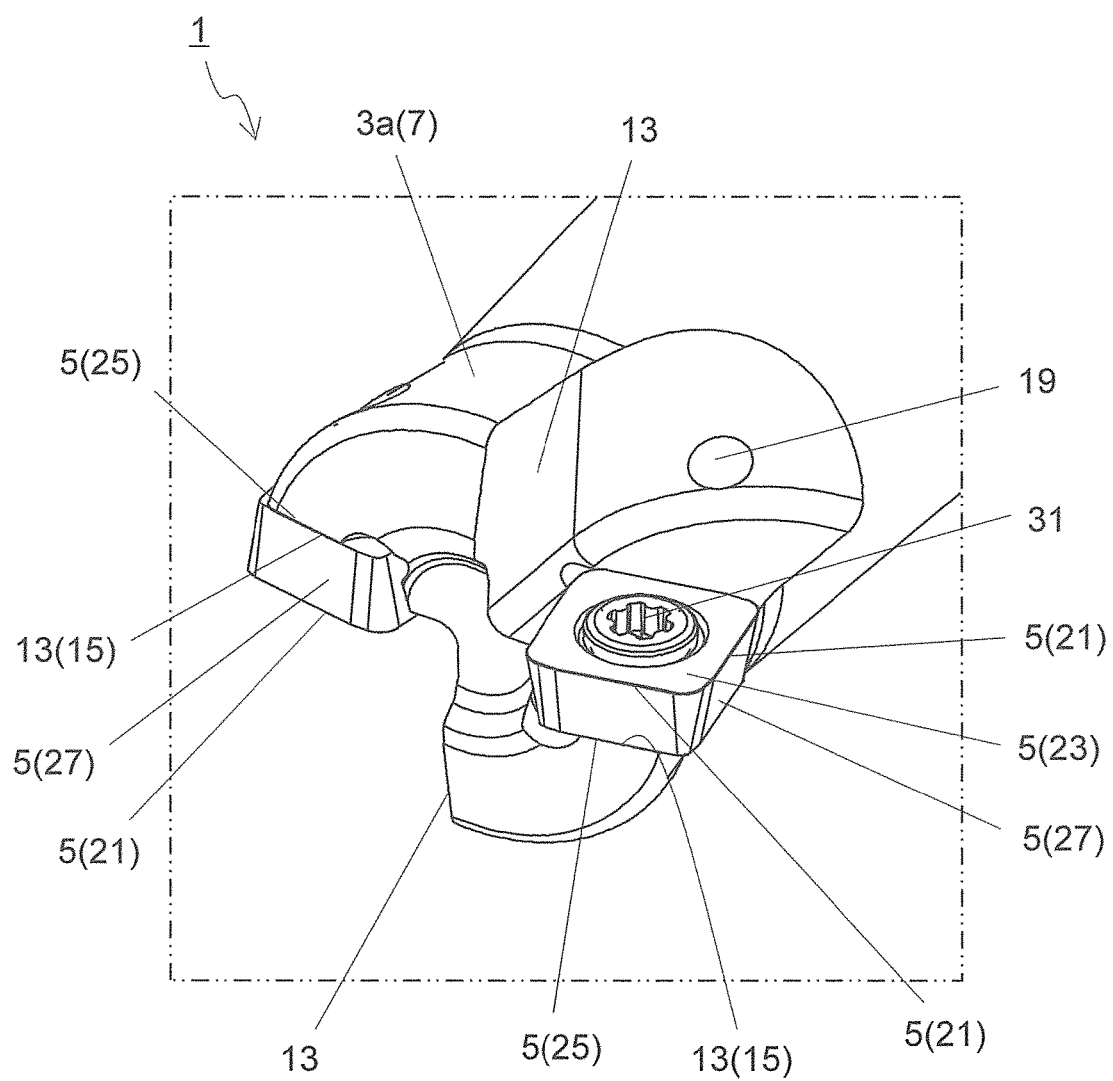
FIG. 2 is an enlarged view of a region A1 illustrated in FIG. 1.
Figure 3:
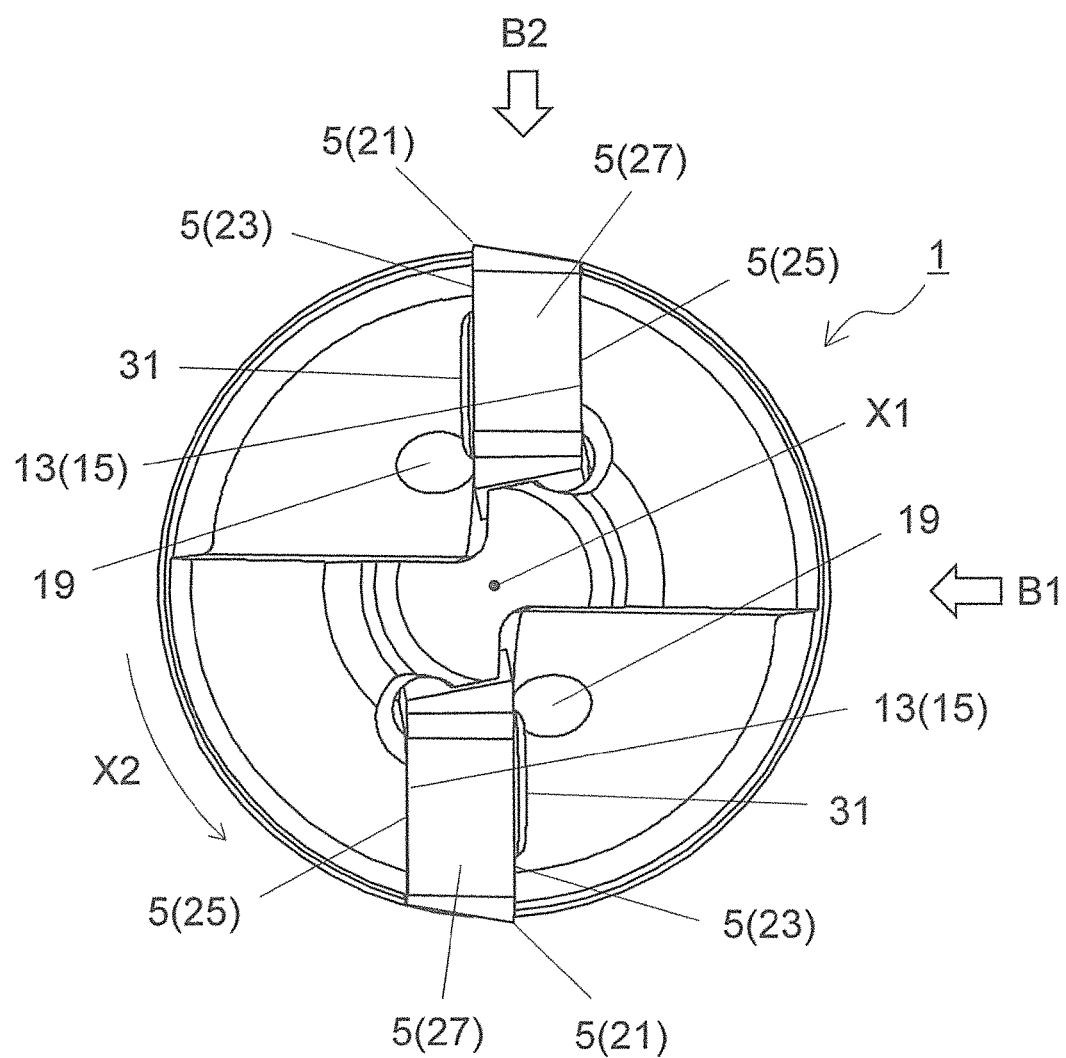
FIG. 3 is a front view of a first end part of the cutting tool illustrated in FIG. 1.
Figure 4:
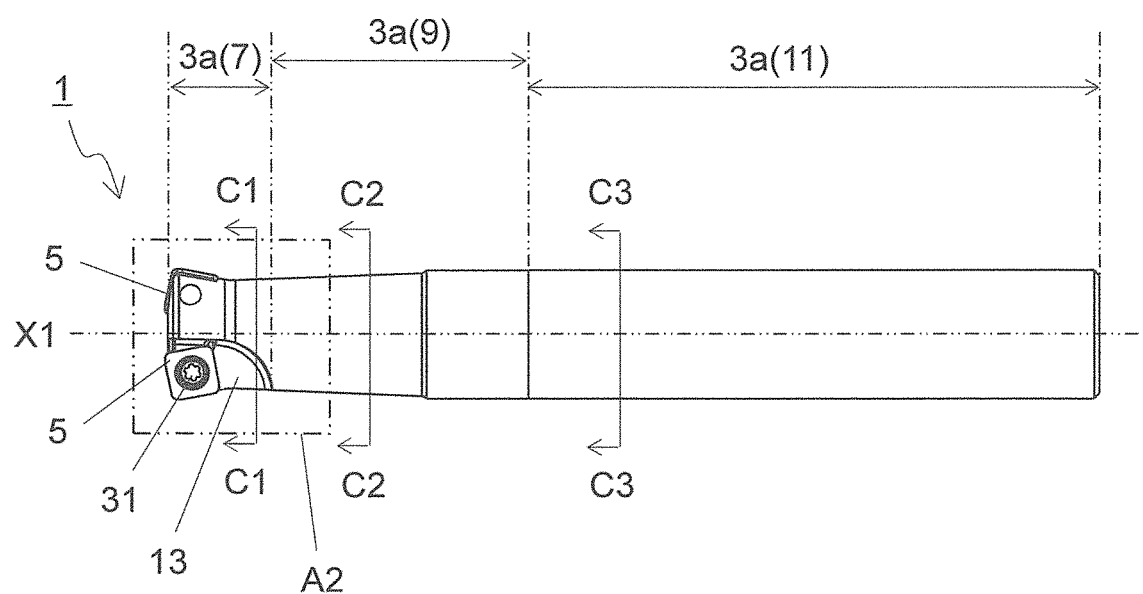
FIG. 4 is a side view of the cutting tool illustrated in FIG. 3 when viewed from B1 direction.

A holder according to one embodiment and a cutting tool including the holder are described in detail below with reference to the drawings. For the sake of description, each of the drawings referred to in the following shows, in a simplified form, a main member of members constituting the present embodiment. Hence, the holder and the cutting tool of the present invention are capable of including any structural member not shown in the drawings referred to. Sizes of the members in each of the drawings are not ones which faithfully represent the actual structural members and size ratios of these members.

The cutting tool 1 of the present embodiment is described below with reference to FIGS. 1 to 10

The cutting tool 1 of one embodiment includes the holder 3 and a plurality of cutting inserts 5 (hereinafter also referred to simply as "inserts 5") as shown in FIG. 1. Although FIG. 1 illustrates the case of including the two inserts 5, the number of the inserts 5 is not limited to two. The number of the inserts 5 may be only one, or alternatively three or more.

The holder 3 of the present embodiment includes a body part 3a. The body part 3a has a rotation axis X1, and is a bar-shaped member extending from a first end part to a second end part along the rotation axis X1. Specifically, the body part 3a is a columnar body in the present embodiment. The body part 3a rotates in a rotation direction X2 around the rotation axis X1 during a cutting process of a workpiece for manufacturing a machined product. A central axis of the body part 3a that is the columnar body coincides with the rotation axis X1 of the body part 3a.

Hereinafter, the first end part is referred to as "front end," and the second end part is referred to as "rear end." A side close to the rotation axis X1 is referred to as "a rotation axis side," and a side away from the rotation axis X1 is referred to as "an outer peripheral surface side." A direction from the rear end of the body part 3a to the front end thereof is referred to as "a front end direction," and a direction from the front end of the body part 3a to the rear end thereof is referred to as "a rear end direction."

The body part 3a in the present embodiment includes a first member 7, a second member 9, and a third member 11, and has the columnar shape as a whole. The first member 7 is located on the front end side in the body part 3a, and includes a pocket 13 designed to accept attachment of the insert 5. Because the cutting tool 1 of the present embodiment includes a plurality of the inserts 5, the first member 7 includes a plurality of pockets 13. Therefore, a region extending from the front end to the pocket 13 in a direction along the rotation axis X1 in the body part 3a is referred to as the first member 7 in the present embodiment.

The third member 11 is located on the rear end side in the body part 3a. The third member 11 is a member having an approximately constant outer diameter, which is designed to be held by and coupled to a machine tool (not shown). The third member 11 is also referred to as "a shank." The second member 9 is a member located between the first member 7 and the third member 11. In the present embodiment, an outer diameter of the second member 9 is gradually increased from the front end side to the rear end side.

In other words, the body part 3a in the present embodiment includes the first member 7 located on the front end side, the second member 9 located closer to the rear end side than the first member 7, and the third member 11 located closer to the rear end side than the second member 9.

The pockets 13 disposed in the first member 7 are respectively opened into the front end side and the outer peripheral surface side of the body part 3a. Each of the pockets 13 has a mounting surface 15 designed to accept mounting of the insert 5. The mounting surface 15 is provided with a screw hole. The insert 5 is fixable to the holder 3 by screwing a screw 31 into the screw hole.

The pockets 13 may be disposed at equal intervals or unequal intervals so as to have rotational symmetry with respect to the rotation axis X1 when the holder 3 is viewed from the front end. When the intervals between the pockets 13 adjacent to each other in a rotation direction are constant, it is possible to reduce variation in cutting load exerted on the inserts 5 respectively attached to the pockets 13.

Meanwhile, when the intervals of the pockets 13 adjacent to each other in the rotation are not constant, chatter vibration is can be reduced. The phrase "when the intervals of the pockets 13 adjacent to each other in the rotation are not constant" denotes, for example, the following situation. That is, in the case of including, as the pocket 13, a first pocket and a second pocket adjacent each other in the rotation direction, and a third pocket and a fourth pocket adjacent to each other in the rotation direction, the interval between the first and second pockets is larger than the interval between the third and fourth pockets.

Figure 5:
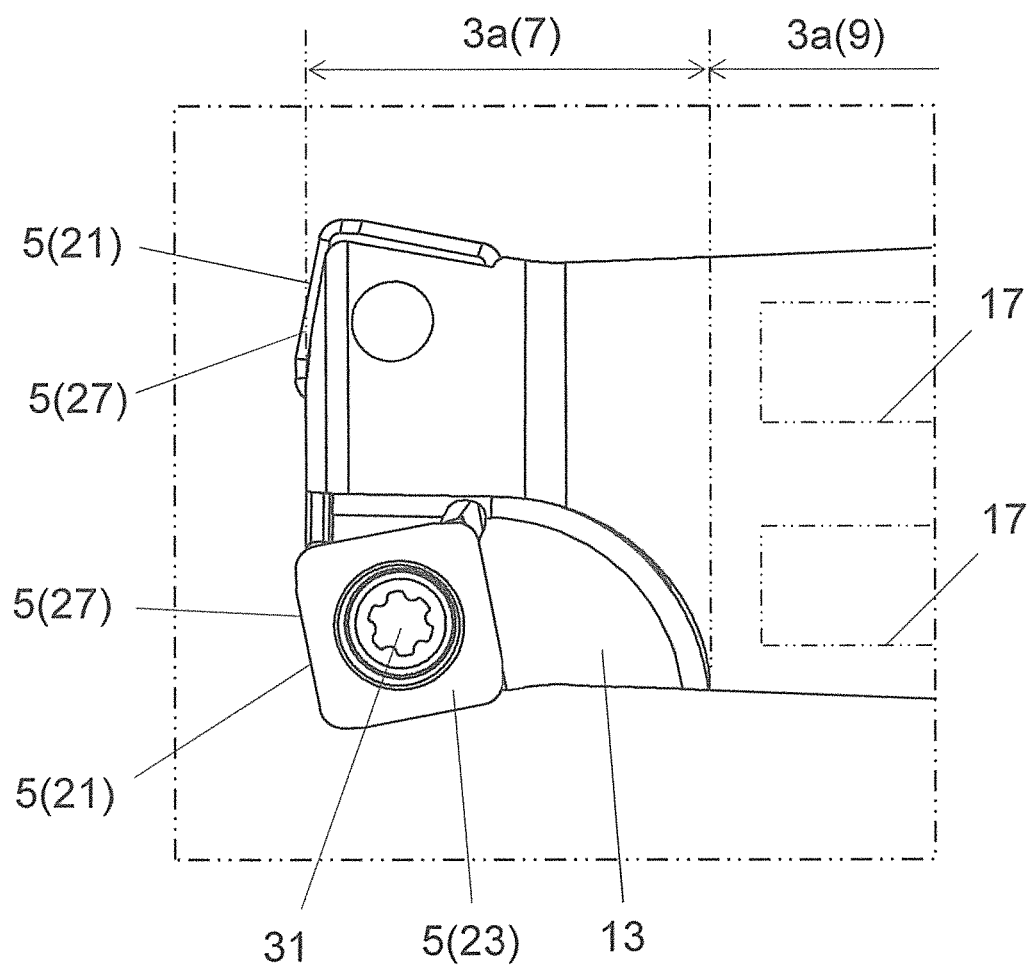
FIG. 5 is an enlarged view of a region A2 illustrated in FIG. 4.
Figure 6:
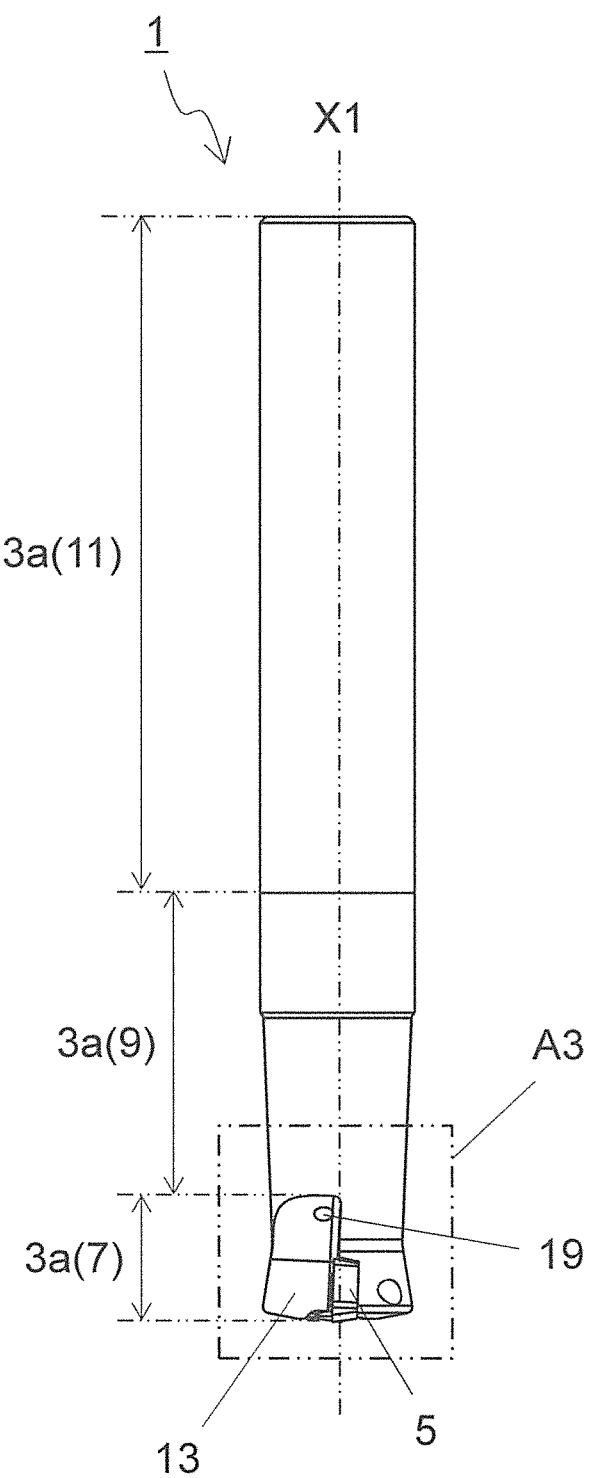
FIG. 6 is a side view of the cutting tool illustrated in FIG. 3 when viewed from B2 direction.
Figure 7:
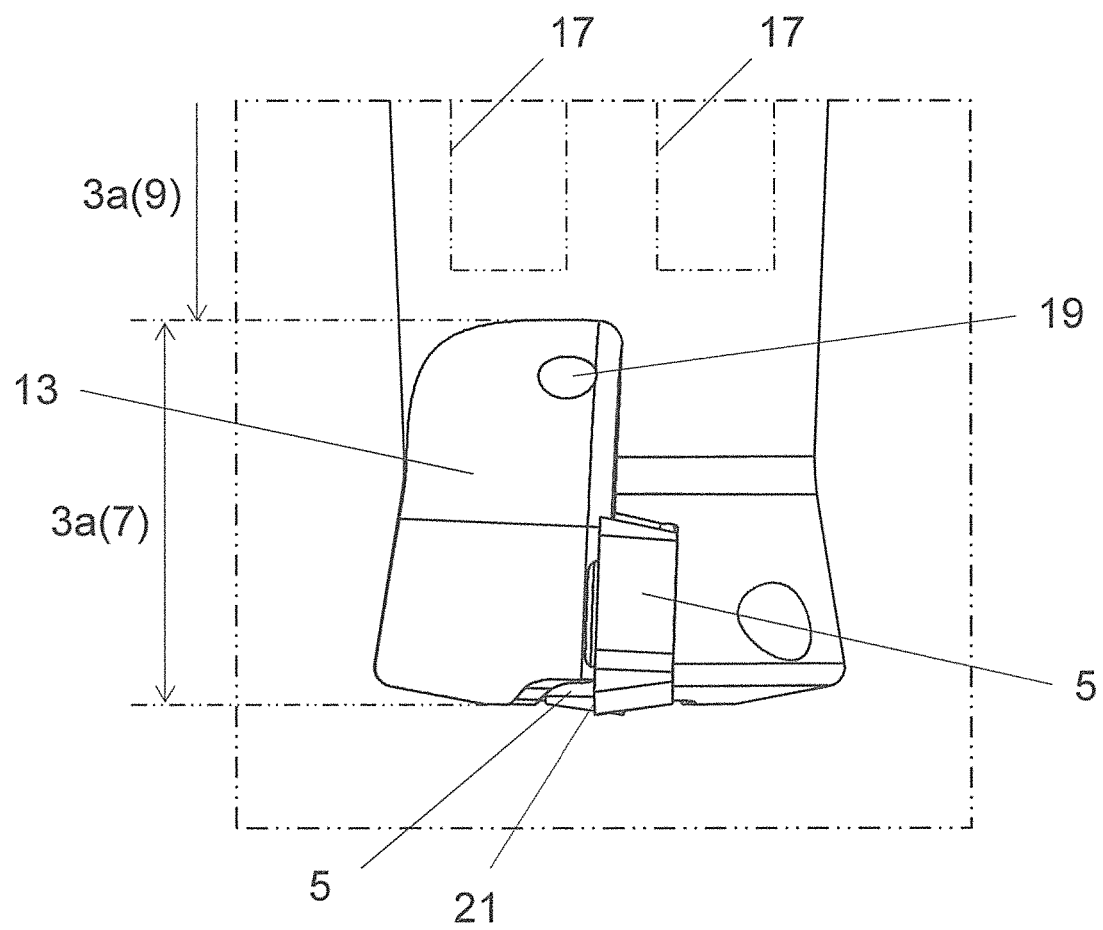
FIG. 7 is an enlarged view of a region A3 illustrated in FIG. 6.
Figure 8:
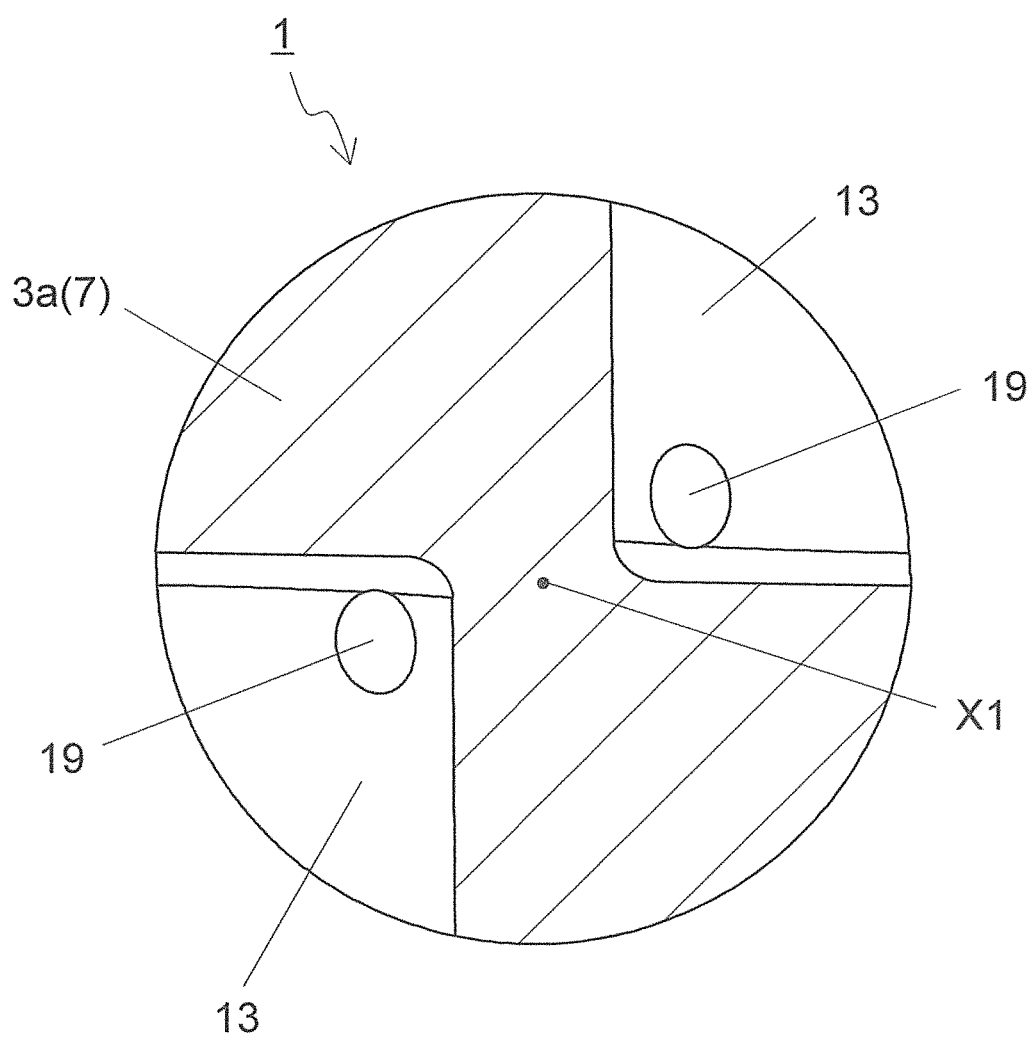
FIG. 8 is a sectional view taken at C1 of the cutting tool illustrated in FIG. 4.
Figure 9:
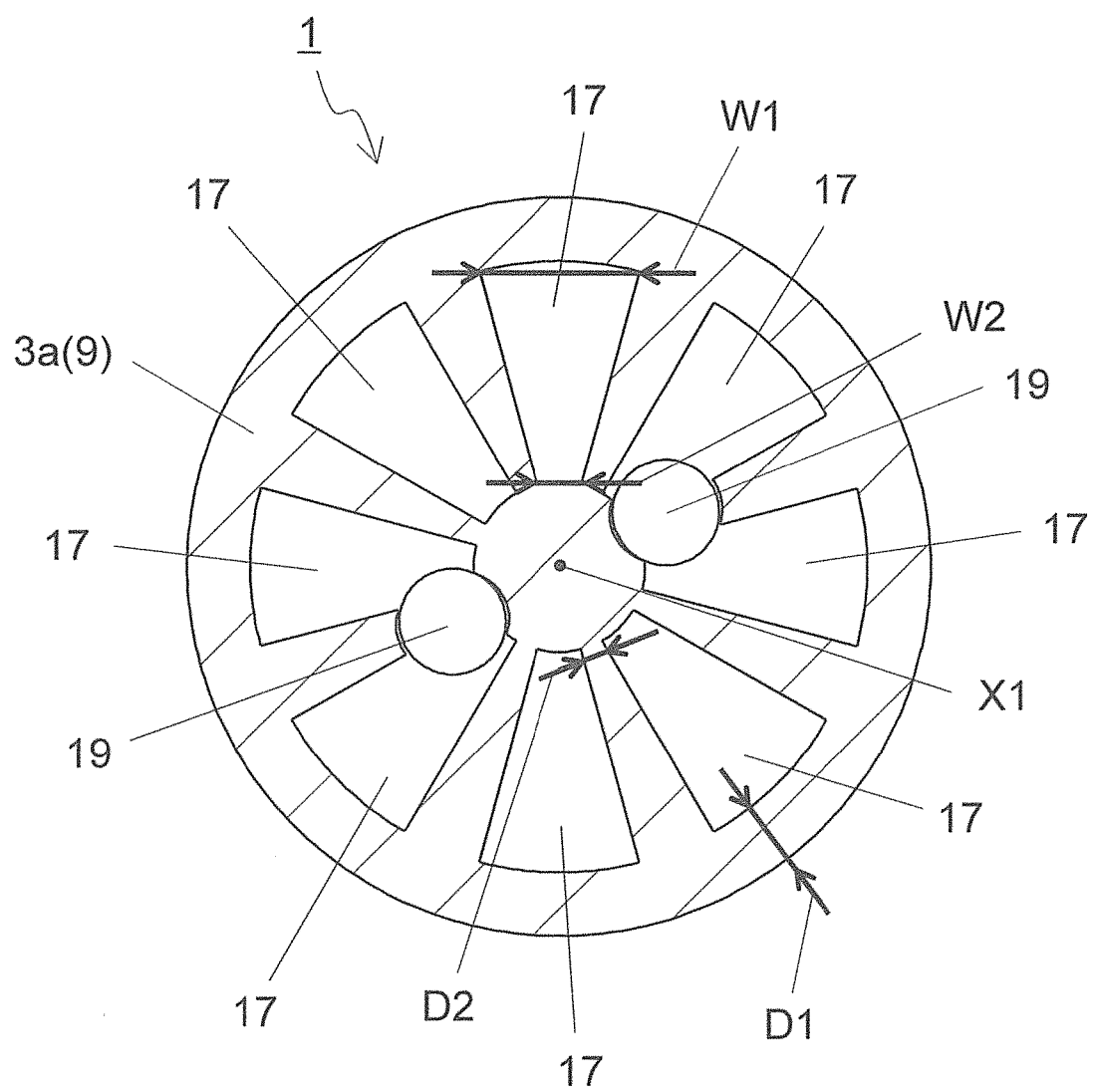
FIG. 9 is a sectional view taken at C2 of the cutting tool illustrated in FIG. 4.
Figure 10:
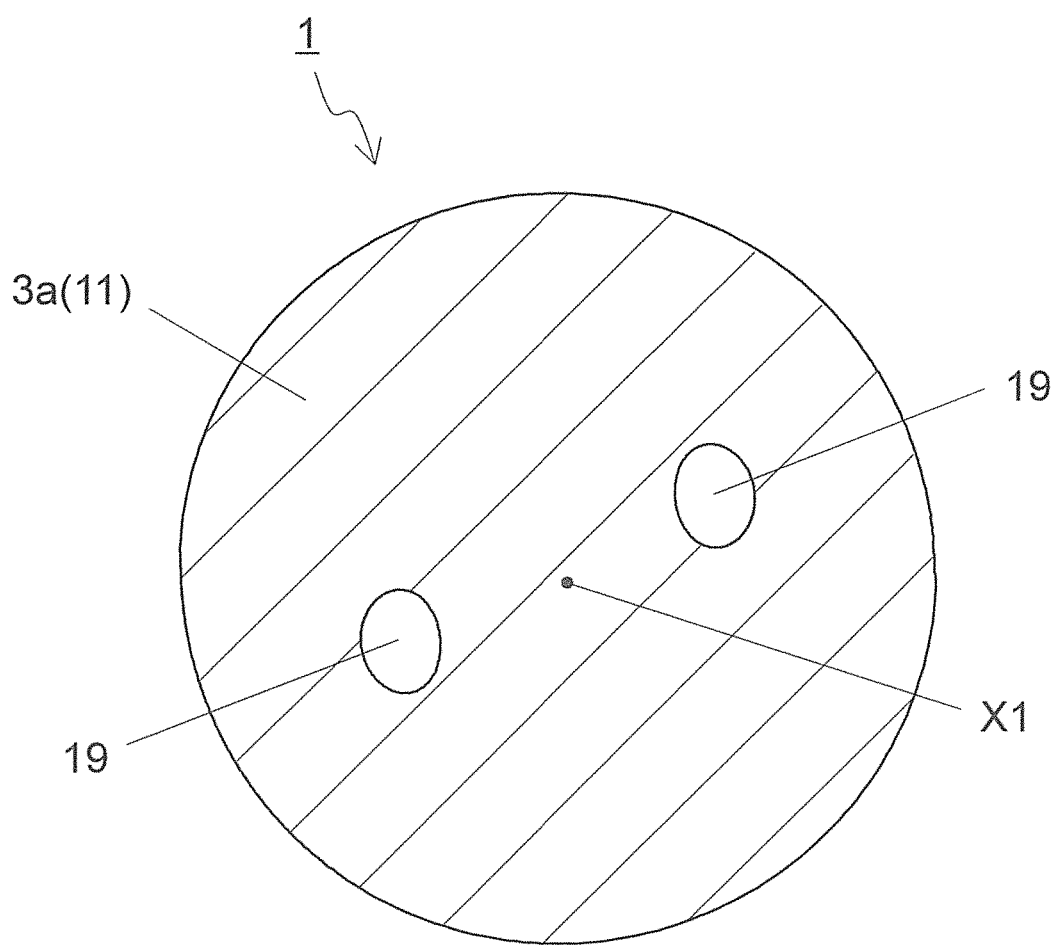
FIG. 10 is a sectional view taken at C3 of the cutting tool illustrated in FIG. 4.

The second member 9 in the present embodiment includes a cavity 17 inside the second member 9 as shown in FIGS. 5, 7, and 9. Because the second member 9 includes the cavity 17 therein, a cross-sectional area of the second member 9 in a cross section orthogonal to the rotation axis X1 is reducible by an amount of the cavity 17. The second member 9 is therefore apt to be twisted.

Specifically, a principal force of the cutting resistance is applied from the workpiece through the insert 5 to the first member 7 of the body part 3a in a direction opposite to the rotation direction X2 during the cutting process. The principal force may cause chatter vibration in the cutting tool 1 in a situation where the third member 11 is held by a machine tool. With the above configuration, the second member 9 is apt to be twisted, and vibrations, such as the chatter vibration, can be reduced by the twist of the second member 9. Additionally, degradation of chip discharge performance is can also be reduced because there is no need to dispose the upper wall part as described in Patent Document 1.

The cross-sectional area of the second member 9 is also reducible by making the outer diameter of the second member 9 smaller than an outer diameter of each of the first member 7 and the third member 11. However, the rigidity of the second member 9 may be lowered when the outer diameter of the second member 9 is made smaller.

Specifically, a feed force of cutting resistance is applied from the workpiece through the insert 5 to the first member 7 of the body part 3a in a direction opposite to a feed direction of the cutting tool 1 during the cutting process. When the outer diameter of the second member 9 is smaller in this situation, the rigidity of the second member 9 may be lowered, and durability against the feed force may be lowered.

Because the second member 9 includes therein the cavity 17 in the holder 3 of the present embodiment, the outer diameter of the second member 9 is made approximately equal to the outer diameter of each of the first member 7 and the third member 11 in order to restrain the rigidity degradation of the second member while achieving an easily twisted structure. This leads to the holder 3 capable of reducing the occurrence of chatter vibration.

In the holder 3 of the present embodiment, the second member 9 includes therein a portion having a small modulus of transverse elasticity, namely, an easily twisted portion. Specifically, the second member 9 includes the cavity 17 as the portion having the small modulus of transverse elasticity. Therefore, the second member 9 has an easily twisted structure.

Figure 11:
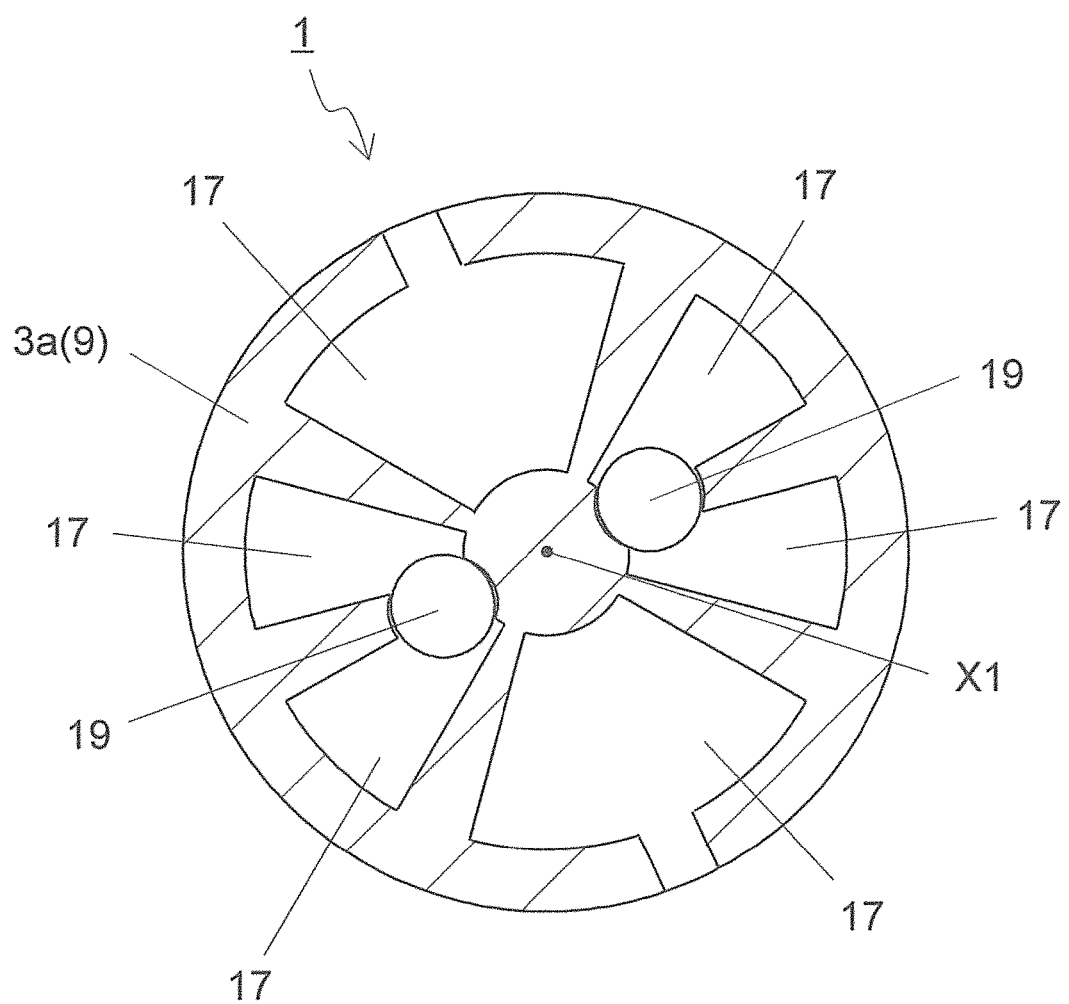
FIG. 11 is a sectional view illustrating a cutting tool in another embodiment.

Although the cavity 17 may be opened into the outer peripheral surface of the second member 9 as shown in FIG. 11, the second member 9 is preferably not opened into the outer peripheral surface in order to enhance the rigidity of the second member 9. For the same reason, the cavity 17 is preferably not opened into the pocket 13. FIG. 11 is a sectional view corresponding to FIG. 9 in the cutting tool 1 of one embodiment.

Even when the cavity 17 is opened into the outer peripheral surface of the second member 9, an opening region is preferably minimized to enhance the rigidity of the second member 9. Specifically, a width of the opening region is preferably smaller than a maximum value of a width in a direction orthogonal to the rotation axis X1 in the second member 9, in a sectional view as shown in FIG. 11.

The cavity 17 is disposed inside the second member 9. This means that the second member 9 is located, as an easily twisted member due to the cavity 17, at least between the first member 7 subjected to cutting resistance from the workpiece through the insert 5, and the third member 11 to be held by the machine tool. Therefore, the cavity 17 in the present embodiment is disposed only in the second member 9, but is not limited to this configuration.

Figure 12:
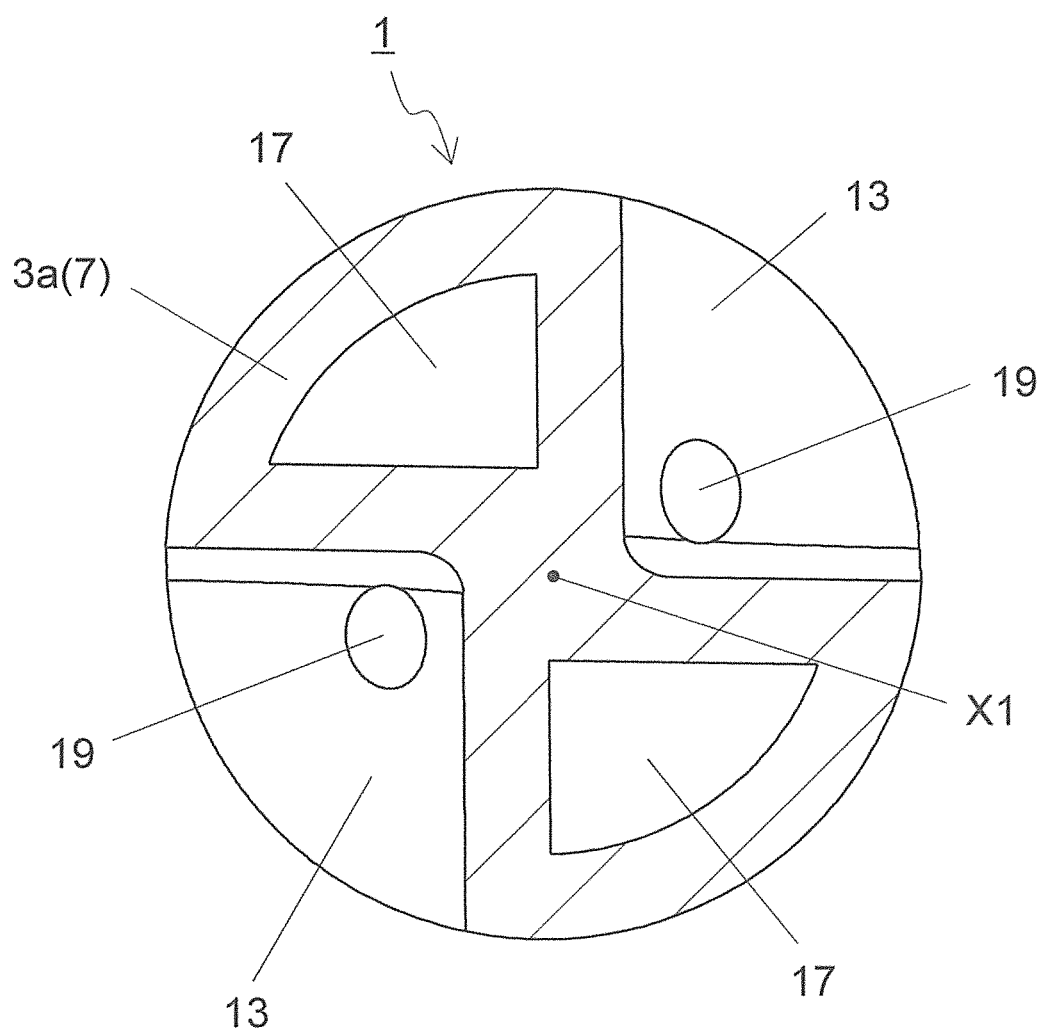
FIG. 12 is a sectional view illustrating a cutting tool in still another embodiment.

For example, as shown in FIG. 12, the cavity 17 extends from the second member 9 to the first member 7. In other words, the cavity 17 may exist inside the first member 7 and the second member 9. However, the cavity 17 is preferably not disposed in the first member 7 in order to enhance the rigidity of the first member 7. FIG. 12 is a sectional view corresponding to FIG. 8 in the cutting tool 1 of one embodiment.

Alternatively, the cavity 17 may extend from the second member 9 to the third member 11. However, because the third member 11 is the member to be held by the machine tool, the cavity 17 is preferably not disposed in the third member 11 in order that the machine tool can stably hold the third member 11.

For example, steel, cast iron, and aluminum alloy are usable as a material of the body part 3a. The cutting tool 1 of the present embodiment employs steel having high strength among these materials. A size of the body part 3a is suitably settable according to a size of a workpiece subjected to a cutting process, or a size of a machine tool designed to accept attachment of the cutting tool 1.

For example, a length in the direction along the rotation axis X1 is settable to approximately 50-300 mm. A width (diameter) in the direction orthogonal to the rotation axis X1 is settable to approximately 20-100 mm. The body part 3a is not a precise columnar body as is apparent from the fact that the first member 7 is provided with the plurality of pockets 13.

The body part 3a in the present embodiment may include, besides the cavity 17, a through hole 19 extending from the third member 11 through the second member 9 to the pocket 13 in the first member 7. When provided with the through hole 19, the insert 5 can be cooled by supplying a coolant from the outside.

An opening position of the through hole 19 is not limited. For example, the through hole 19 may be opened into a rear end surface in the third member 11 and into the outer peripheral surface of the third member 11. Although the through hole 19 extends toward the pocket 13, an opening of the through hole 19 in the pocket 13 may be located in the mounting surface 15 designed to accept the mounting of the insert 5, or in other regions. In the present embodiment, the through hole 19 is opened toward the insert 5 in a region other than the mounting surface 15 in order to efficiently cool a cutting edge of the insert 5.

The through hole 19 in the present embodiment is located away from the cavity 17. In other words, there is no connection between the inside of the through hole 9 and the inside of the cavity 17. When there is a connection between the through hole 19 and the cavity 17, the coolant may flow into the cavity 17, so that a flow of the coolant can be inhibited in the cavity 17. Whereas, when the through hole 19 is located away from the cavity 17, the coolant does not flow into the cavity 17, thus ensuring a smooth flow of the coolant.

Figure 13:
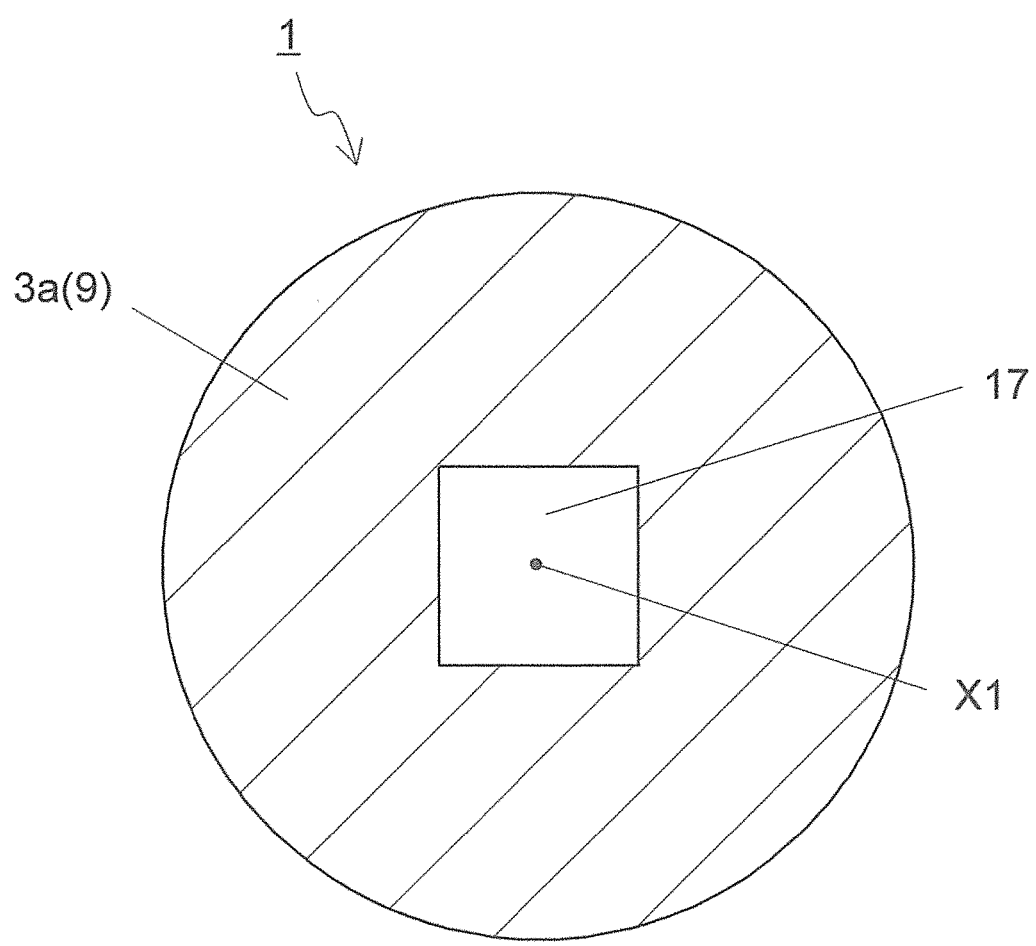
FIG. 13 is a sectional view illustrating a cutting tool in yet another embodiment.
Figure 14:
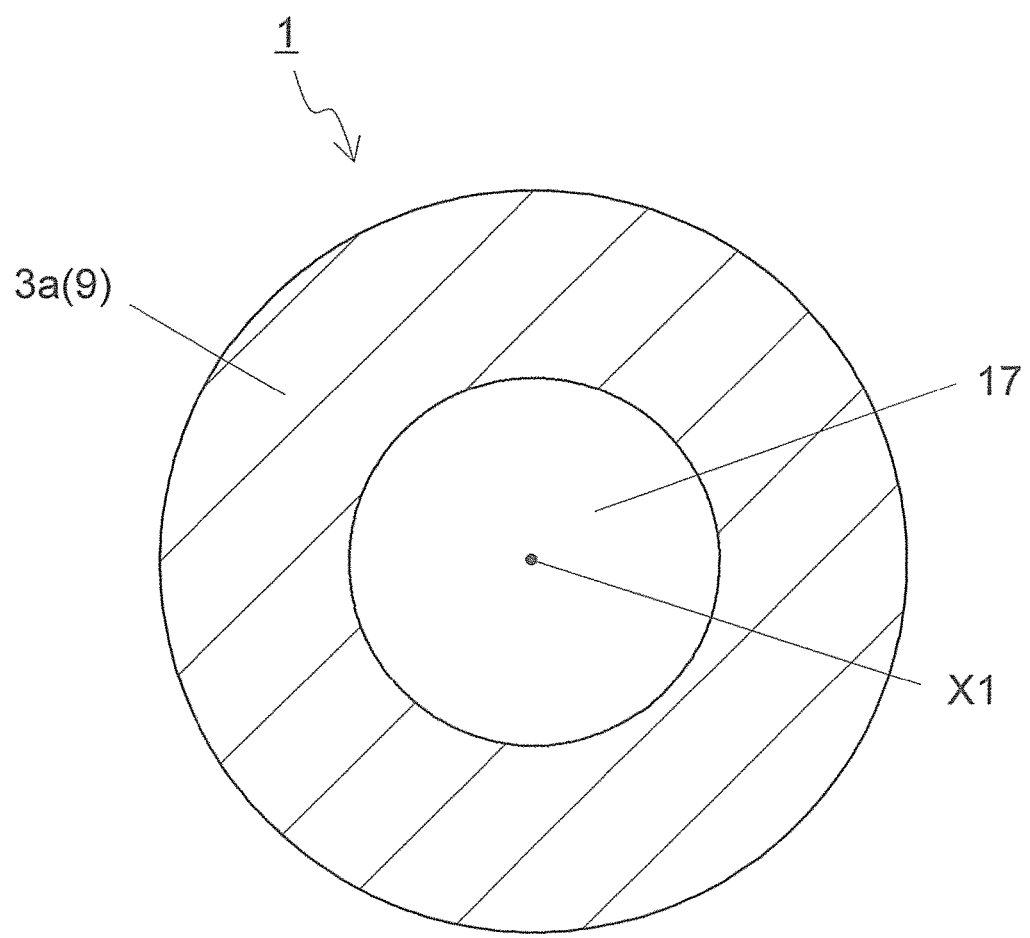
FIG. 14 is a sectional view illustrating a cutting tool in a further embodiment.

A plurality of the cavities 17 may be located inside the second member 9 as shown in FIGS. 11 and 12. Alternatively, the single cavity 17 may be located inside the second member 9 as shown in FIGS. 13 and 14. In the embodiments respectively shown in FIGS. 13 and 14, the cavity 17 is located at a central region of the second member 9 including the rotation axis X1. The rotation axis X1 is less apt to deviate because the single cavity 17 is located at the central region of the second member 9 as shown in FIGS. 13 and 14. FIGS. 13 and 14 are respectively sectional views taken at positions corresponding to C2 in FIG. 4 in other embodiments. The cavity 17 may also serve as the through hole 19 in the embodiments shown in FIGS. 13 and 14.

In order to ensure a thickness of the second member 9 between the cavity 17 and the outer peripheral surface while ensuring a large area of the cavity 17 in the cross section orthogonal to the rotation axis X1, the cavity 17 in the cross section preferably has a circular form around the rotation axis X1 as in the embodiment shown in FIG. 14, instead of the embodiment shown in FIG. 13.

In the present embodiment, the second member 9 may include a plurality of the cavities 17, and the cavities 17 may be located with rotational symmetry around the rotation axis X1. When at least part of the cavities 17 are located with rotational symmetry around the rotation axis X1, deviation of the rotation axis X1 during the cutting process is reducible. Machining accuracy can be enhanced by reducing the deviation of the rotation axis X1.

As used herein, the phrase "the cavities 17 may be located with rotational symmetry around the rotation axis X1" denotes that, when one of the cavities 17 is rotated with reference to the rotation axis X1, there may be a partially non-overlapping region, but regions other than this region are overlapped with each other. In order to make it difficult for the rotation axis X1 to deviate, the cavities 17 located with rotational symmetry preferably have an identical shape so as to be entirely overlapped with each other when the cavities 17 are rotated around the rotation axis X1.

Alternatively, when the second member 9 includes a plurality of the cavies 17 as shown in FIG. 9, a thickness D1 of the second member 9 between the outer peripheral surface and the cavity 17 may be larger than a thickness D2 of the second member 9 between the cavities 17 located on a side of the rotation axis X1.

The rigidity of the second member 9 can be enhanced because the thickness D1 between the outer peripheral surface and the cavity 17 is relatively large in the cross section orthogonal to the rotation axis X1. Moreover, when the thickness D1 between the outer peripheral surface and the cavity 17 is larger than the thickness D2 between the cavities 17 located on the side of the rotation axis X1, the second member 9 becomes apt to be twisted because the thickness D2 between the cavities 17 located on the side of the rotation axis X1 is relatively small. Consequently, the occurrence of chatter vibration can be more stably reduced while retaining high rigidity in the second member 9.

Alternatively, the cavity 17 in the present embodiment may extend along the rotation axis X1. Specifically, in a cross section in a direction along the rotation axis X1, the cavity 17 may be configured so that a length in the direction along the rotation axis X1 is larger than a width in the direction orthogonal to the rotation axis X1. Thus, when the cavity 17 extends along the rotation axis X1 as described above, the second member 9 becomes more apt to be twisted, and the occurrence of chatter vibration can be reduced more.

Still alternatively, as shown in FIG. 9, a width of the cavity 17 on a side of the outer peripheral surface, namely, on a side away from the rotation axis X1 may be larger than a width on a side of the rotation axis X1. The formation of this cavity 17 creates a large space of the cavity 17 in a region of the second member 9 which is a side of the outer peripheral surface. Consequently, the second member 9 becomes more apt to be twisted. In FIG. 9, W1 indicates the width on the side of the outer peripheral surface, and W2 indicates the width on the side of the rotation axis X1.

In particular, it is more preferable that a width of the cavity 17 in a direction orthogonal to a radial direction of the rotation axis X1 increases as going away from the rotation axis X1 in the cross section orthogonal to the rotation axis X1. Thus, the second member 9 becomes more apt to be twisted.

A radial length of the cavity 17 is settable to, for example, 30-70% of a radius of the second member 9 in the cross section orthogonal to the rotation axis X1. A cross-sectional area occupied by the cavity 17 in the cross section orthogonal to the rotation axis X1 is settable to approximately 10-40% of an area of a circumscribed circle of the second member 9.

Figure 15:
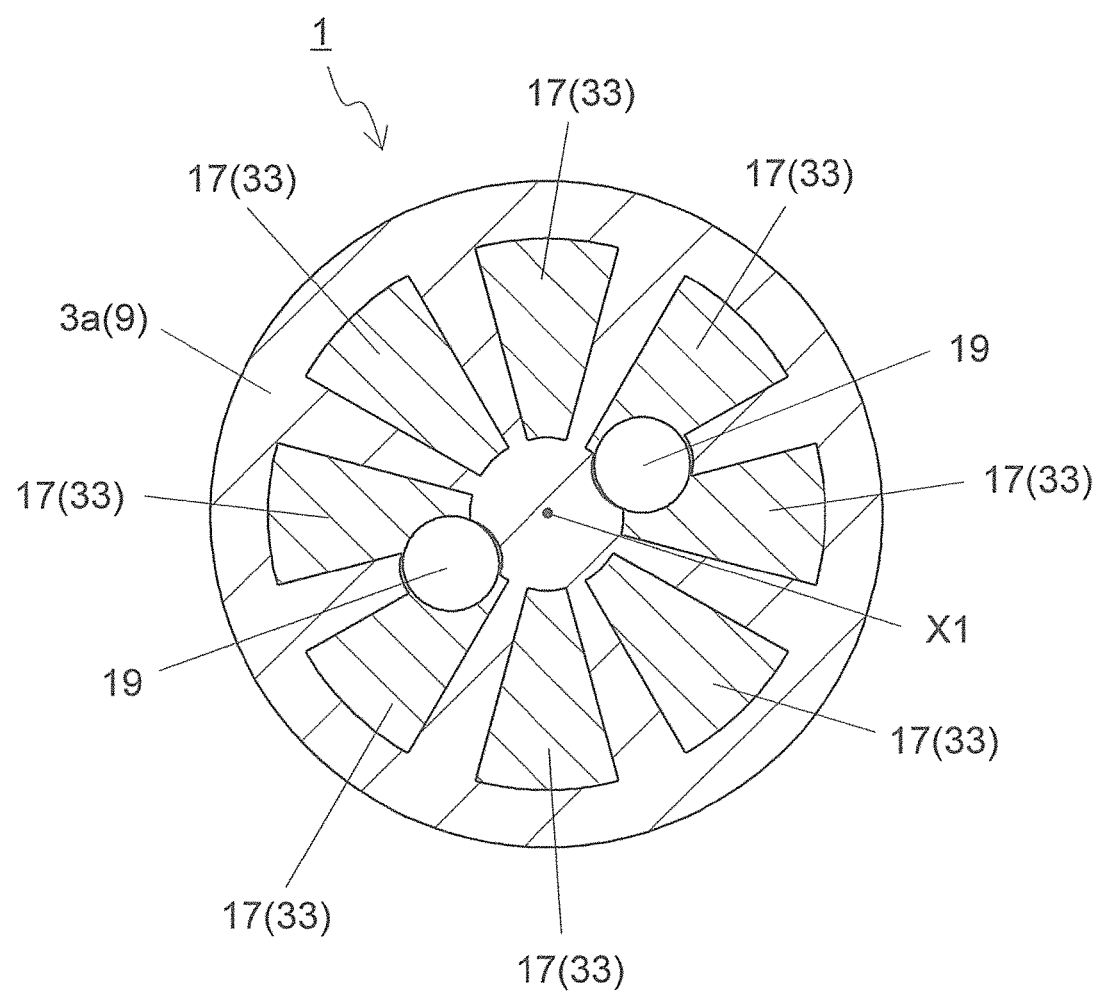
FIG. 15 is a sectional view illustrating a cutting tool in a still further embodiment.

In the holder 3 of the present embodiment, even though nothing may be disposed inside the cavity 17, the cavity 17 may include therein a member 33 of a material that is different from a material constituting the body part 3a and has a small modulus of transverse elasticity, as shown in FIG. 15. That is, the holder 3 may be made up of the body part 3a and the member 33 located inside the cavity 17. FIG. 15 is a sectional view corresponding to FIG. 9 in the cutting tool 1 of one embodiment.

A state in which the second member 9 is apt to be twisted can be ensured by including the member 33 of the material different from the material constituting the body part 3a. Specifically, for example, a resin material, such as an epoxy resin, is usable as the member of the material different from the material constituting the holder 3. The member of the material different from the material constituting the holder 3 may be partially disposed in the cavity 17.

The inserts 5 are respectively attached to the pockets 13 included in the holder 3. Each of the inserts 5 in the present embodiment has a quadrangular prism shape having a cutting edge 21 as shown in FIGS. 1 to 7. Specifically, the insert 5 has a quadrangular plate shape including a quadrangular shaped upper surface 23, a quadrangular shaped lower surface 25, and a side surface 27 located between the upper surface 23 and the lower surface 25. When the insert 5 is attached to the holder 3, the upper surface 23 is located forward in the rotation direction X2 of the rotation axis X1, and the lower surface 25 is located backward in the rotation direction X2 of the rotation axis X1. The side surface 27 is made up of four surface regions corresponding to four side parts of the upper surface 23 and the lower surface 25.

When the insert 5 is attached to the holder 3, the lower surface 25 is a surface that is located backward in the rotation direction X2, and brought into contact with the mounting surface 15 of the holder 3. When the insert 5 is attached to the holder 3, a part of the side surface 27 protrudes outward from the holder 3 and toward the front end. The cutting edge 21 is formed along a ridge part where the upper surface 23 intersects with the side surface 27.

The phrase "the upper surface 23 and the lower surface 25 have a quadrangular shape" denotes that both surfaces need to be an approximately quadrangular shape, instead of a precise quadrangular shape. Each of four corner parts may be made into a rounded shape in a front view. Side parts located so as to connect the corner parts adjacent to each other need not have a precise straight line shape, namely, may be made into a shape, part of which has irregularities.

At least a part of the upper surface 23 functions as "a rake surface" that permits flow of chips during the cutting process, because the cutting edge 21 is formed along the ridge part where the upper surface 23 intersects with the side surface, and the upper surface 23 is located forward in the rotation direction X2 of the rotation axis X1. At least a part of the side surface 27 functions as "a flank surface" during the cutting process. The cutting edge 21 needs to be located at least a part of the ridge part where the two surfaces in the insert 5 intersect each other, namely, the cutting edge 21 needs not be located over the entirety of the ridge part where the upper surface 23 intersects with the side surface 27.

For example, cemented carbide or cermet is usable as a material of the insert 5. Examples of compositions of the cemented carbide include WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

A surface of each of the above members constituting the insert 5 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

In order to enhance strength of cutting edge portions, the insert 5 may have such a structure that, for example, a diamond sintered body or a CBN sintered body is brazed to a base material composed of the above-mentioned material.

Each of the inserts 5 of the present embodiment includes a hole part that intersects with the lower surface 25 and extends between the lower surface 25 and the upper surface 23. The hole part in the present embodiment extends from the lower surface 25 in a direction along the rotation direction X2.

The hole part is a portion for screwing each of the inserts 5 into the holder 3. That is, the insert 5 is fixed to the holder 3 by inserting the screw 31 into the hole part of the insert 5, and then inserting a front end of the screw 31 into a screw hole formed in the mounting surface 15, and thereafter fixing the screw 31 into the screw hole.

Although the size of the insert 5 is not particularly limited, for example, a maximum value of a thickness in a direction from the upper surface 23 to the lower surface 25 in a front-end view is settable to approximately 3-10 mm in the insert 5 of the present embodiment. A length of each of the sides of the upper surface 23 is settable to approximately 5-20 mm.

In the cutting tool 1 of the present embodiment, each of the inserts 5 is attached to the holder 3 so that the upper surface 23 is inclined relative to the rotation axis X1 in a side view. An inclination angle is a so-called axial rake, which is settable to, for example, approximately 0-20° in the present embodiment.

Although the cutting tool 1 of one embodiment has been described in detail with reference to the drawings, the cutting tool of the present invention is not limited to the configurations in the foregoing embodiments.

A method of manufacturing a machined product according to one embodiment is described below with reference to the drawings.

The machined product is manufacturable by subjecting a workpiece to a cutting process. The method of manufacturing the machined product according to the present embodiment includes the following steps of:

(1) rotating the cutting tool as typified by the foregoing embodiment around the rotation axis X1;

(2) bringing the cutting edge in the cutting tool being rotated into contact with a workpiece 101; and (3) moving the cutting tool away from the workpiece 101.

Figure 16:
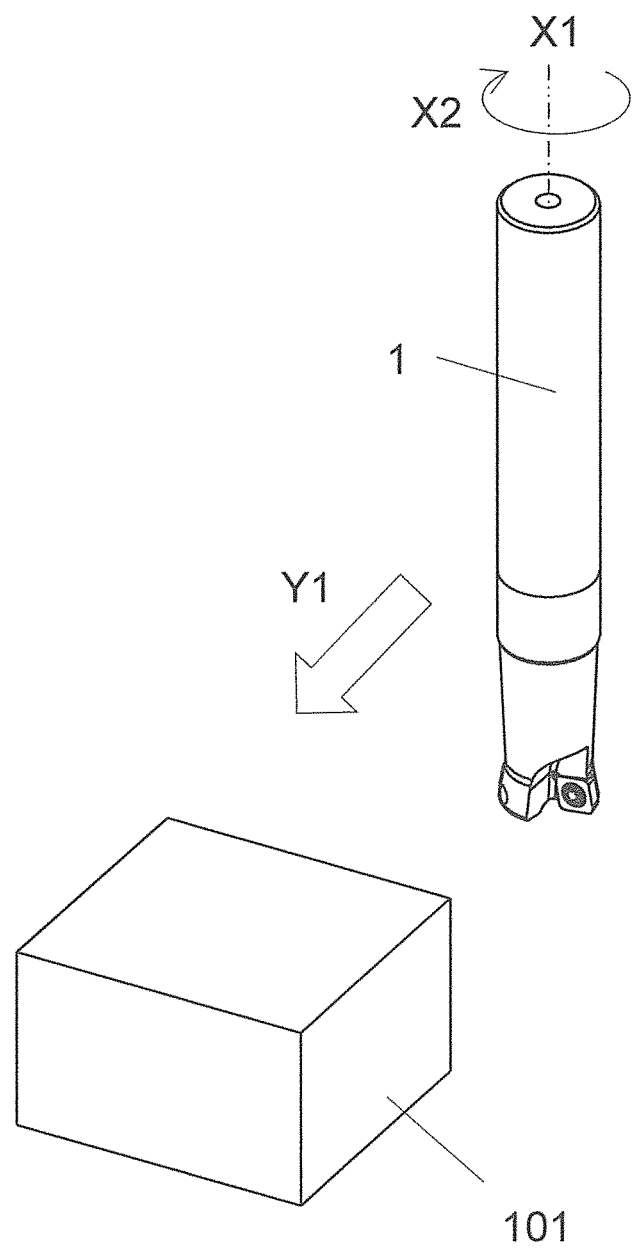
FIG. 16 is a schematic diagram illustrating a step in a method of manufacturing a machined product in one embodiment.
Figure 17:
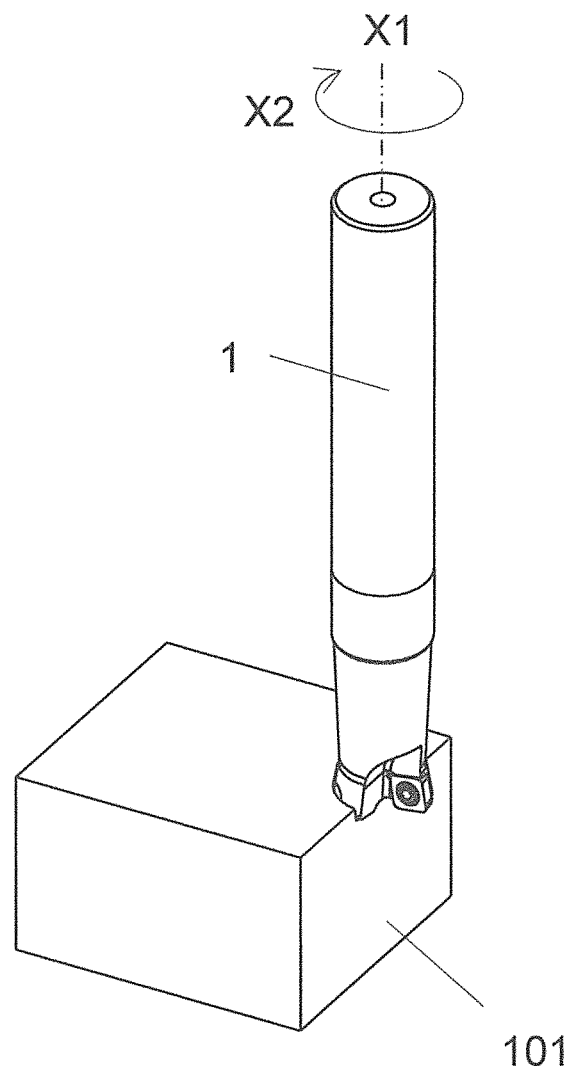
FIG. 17 is a schematic diagram illustrating a step in the method of manufacturing a machined product in one embodiment.
Figure 18:
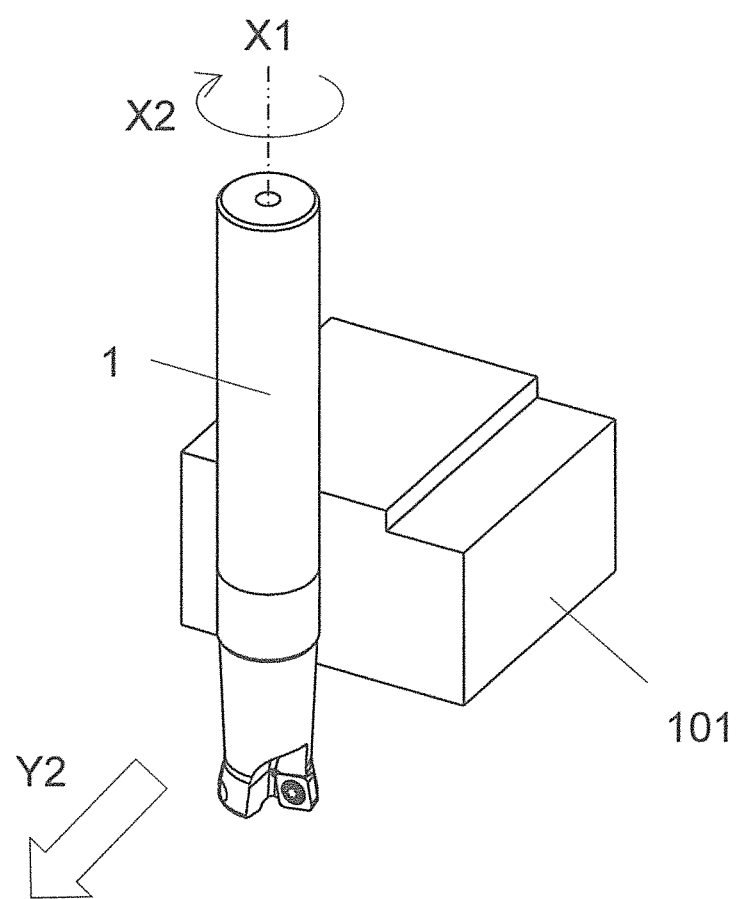
FIG. 18 is a schematic diagram illustrating a step in the method of manufacturing a machined product in one embodiment.

More specifically, as shown in FIG. 16, a first step is to bring the cutting tool relatively near the workpiece 101 by moving the cutting tool in Y1 direction while rotating the cutting tool around the rotation axis X1. A subsequent step is to cut the workpiece 101 by bringing the cutting edge in the cutting tool into contact with the workpiece 101 as shown in FIG. 17. A final step is to move the cutting tool relatively away from the workpiece 101 by moving the cutting tool in Y2 direction as shown in FIG. 18.

In the present embodiment, the workpiece 101 is fixed, and the cutting tool being rotated around the rotation axis X1 is brought near the workpiece 101. In FIG. 17, the workpiece 101 is cut by bringing the cutting edge of the insert being rotated into contact with the workpiece 101. In FIG. 18, the cutting tool being rotated is kept away from the workpiece 101.

Although the cutting tool is brought into contact with the workpiece 101, or the cutting tool is kept away from the workpiece 101 by moving the cutting tool in each of the steps during the cutting process in the manufacturing method of the present embodiment, it is, of course, not intended to limit to this embodiment.

For example, in the step (1), the workpiece 101 may be brought near the cutting tool. Similarly, in the step (3), the workpiece 101 may be kept away from the cutting tool. When the cutting process is continued, it is necessary to repeat the step of bringing the cutting edge of the insert into contact with different portions of the workpiece 101, while the cutting tool is kept rotating.

Representative examples of the material of the workpiece 101 include aluminum, carbon steel, alloy steel, stainless steel, cast iron, and nonferrous metals.

DESCRIPTION OF THE REFERENCE NUMERAL

1 cutting tool
3 holder
5 cutting insert (insert)
7 first member
9 second member
11 third member
13 pocket
15 mounting surface
17 cavity
19 through hole
21 cutting edge
23 upper surface
25 lower surface
27 side surface
31 screw
101 workpiece

What is claimed is:

1. A holder comprising a body part having an elongated shape extending along a rotation axis,
   the body part comprising:
   first and second end parts at both ends thereof;
   a first member on a side of the first end part, comprising a pocket configured to receive a cutting insert;
   a second member located closer to the second end part than the first member, and comprising at least one cavity inside the second member; and
   a third member located closer to the second end part than the second member; wherein
   the second member comprises a plurality of the cavities, and
   a thickness of the second member between an outer peripheral surface and the cavities is larger than a thickness of the second member between the cavities located on a side of the rotation axis in a cross section orthogonal to the rotation axis.

2. The holder according to claim 1,
   wherein the body part further comprises a through hole penetrating from the third member to the pocket, and
   wherein the through hole is away from the at least one cavity.

3. The holder according to claim 1,
   wherein at least part of the cavities are located with rotational symmetry with respect to the rotation axis in a cross section orthogonal to the rotation axis.

4. The holder according to claim 1, wherein the cavity extends along the rotation axis.

5. The holder according to claim 1, wherein a width of the cavity on a side of an outer peripheral surface is larger than a width of the cavity on a side of the rotation axis in a cross section orthogonal to the rotation axis.

6. A cutting tool, comprising:
   a holder according to claim 1; and
   a cutting insert comprising a cutting edge located at least a part of a ridge part where two surfaces intersect each other, the cutting insert being located at the pocket.

7. A method of manufacturing a machined product, comprising:
   rotating a cutting tool according to claim 6 around the rotation axis;
   bringing the cutting edge of the cutting tool being rotated into contact with a workpiece; and
   moving the cutting tool away from the workpiece.

* * * * *